(12) United States Patent
Dayton

(10) Patent No.: US 8,678,473 B2
(45) Date of Patent: Mar. 25, 2014

(54) AERODYNAMIC COMPONENT MOUNTING ASSEMBLY FOR TRACTOR TRAILER

(76) Inventor: Roderick M. Dayton, Strongsville, OH (US)

( * ) Notice: Subject to any disclaimer, the term of this patent is extended or adjusted under 35 U.S.C. 154(b) by 0 days.

(21) Appl. No.: 13/300,427

(22) Filed: Nov. 18, 2011

(65) Prior Publication Data
US 2012/0235441 A1 Sep. 20, 2012

Related U.S. Application Data

(60) Provisional application No. 61/415,137, filed on Nov. 18, 2010, provisional application No. 61/557,967, filed on Nov. 10, 2011.

(51) Int. Cl.
*B62D 35/02* (2006.01)

(52) U.S. Cl.
USPC ...................................... 296/180.4

(58) Field of Classification Search
USPC .......... 296/180.1, 180.2, 180.4, 180.5, 181.5, 296/184.1
See application file for complete search history.

(56) References Cited

U.S. PATENT DOCUMENTS

| | | | |
|---|---|---|---|
| 7,093,889 B2* | 8/2006 | Graham | 296/180.4 |
| 7,578,541 B2* | 8/2009 | Layfield et al. | 296/180.2 |
| 7,789,453 B2* | 9/2010 | Roush et al. | 296/180.1 |
| 7,887,120 B2* | 2/2011 | Boivin et al. | 296/180.4 |
| 7,938,475 B2* | 5/2011 | Boivin et al. | 296/180.4 |
| 7,942,467 B2* | 5/2011 | Boivin et al. | 296/180.4 |
| 7,942,468 B2* | 5/2011 | Boivin et al. | 296/180.4 |
| 8,177,286 B2* | 5/2012 | Brown et al. | 296/180.4 |
| 8,366,180 B2* | 2/2013 | Lee et al. | 296/180.4 |
| 8,413,937 B2* | 4/2013 | Di Franco | 248/201 |
| 2010/0264690 A1* | 10/2010 | Brown et al. | 296/180.4 |
| 2012/0091754 A1* | 4/2012 | Lee et al. | 296/180.4 |
| 2012/0235441 A1* | 9/2012 | Dayton | 296/180.4 |

* cited by examiner

*Primary Examiner* — Glenn Dayoan
*Assistant Examiner* — Gregory Blankenship
(74) *Attorney, Agent, or Firm* — Pearne & Gordon LLP

(57) ABSTRACT

A mounting assembly is provided for coupling an air drag reduction system to a trailer to be transported by an over-the-road tractor. The mounting assembly includes a frame to be suspended adjacent to an underside of the trailer, and a receiver supported adjacent to a first end of the frame. The receiver is adapted to cooperate with a portion of a structural member of the trailer when installed. An adjustable fastening mechanism is separated a suitable distance from the receiver along the frame to be positioned adjacent to a second portion of the structural member opposite the portion that cooperates with the receiver. The adjustable fastening mechanism includes a cam that is adjustable to make contact with the second portion of the structural member of the trailer, thereby interfering with separation of the receiver from the portion of the structural member of the trailer with which the receiver cooperates.

21 Claims, 7 Drawing Sheets

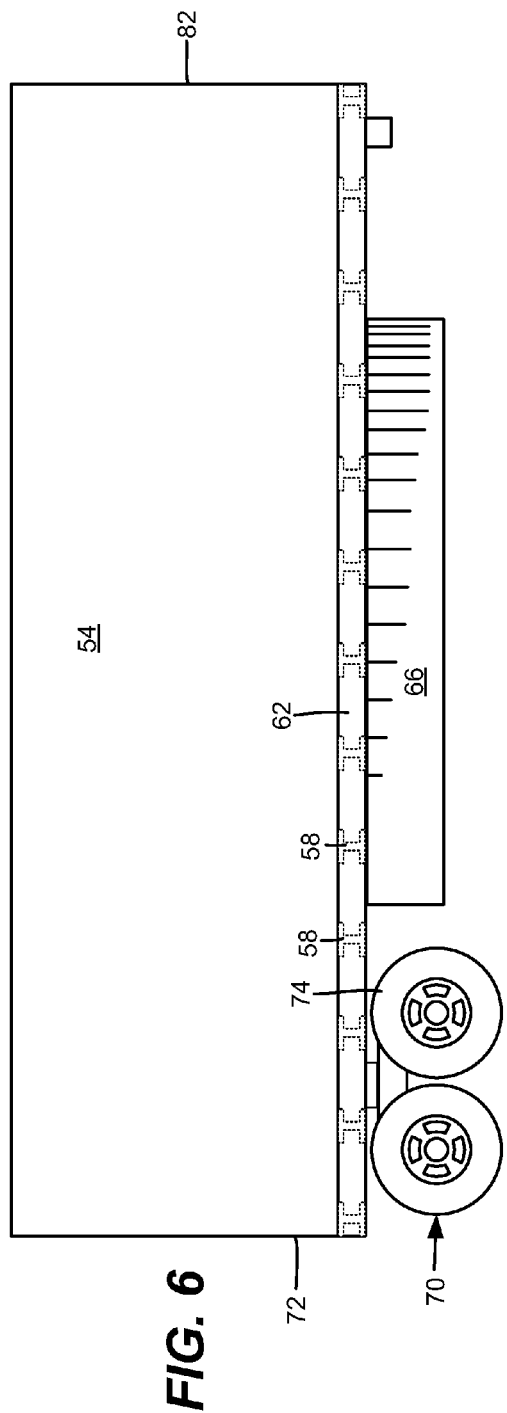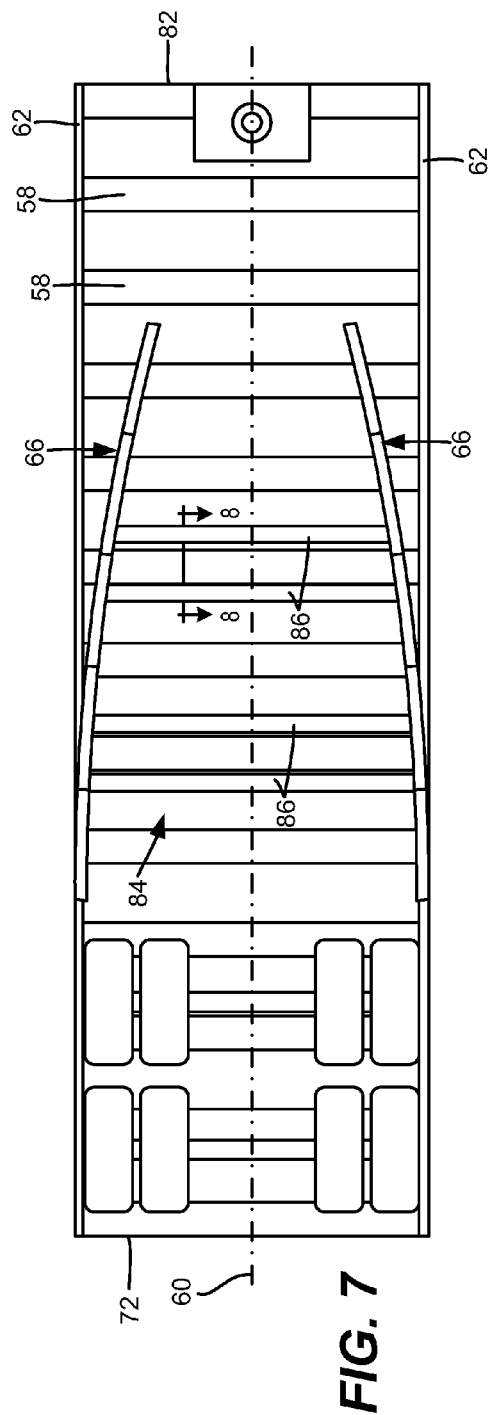

AERODYNAMIC COMPONENT MOUNTING ASSEMBLY FOR TRACTOR TRAILER

CROSS-REFERENCE TO RELATED APPLICATIONS

This application claims the benefit of U.S. Provisional Application No. 61/415,137, filed Nov. 18, 2010, and U.S. Provisional Application No. 61/557,967, filed Nov. 10, 2011, each of which is incorporated in its entirety herein by reference.

BACKGROUND OF THE INVENTION

1. Field of the Invention

This application relates generally to a mounting method and apparatus for coupling components to an over-the-road trailer, and more specifically to a mounting method and apparatus for coupling an aerodynamic drag reduction system to an underside of the over-the-road trailer.

2. Description of Related Art

Conventional methods and apparatus for attaching components to the underside of over-the-road trailers are combinations of fasteners, metal plates, and purpose-made fabrications. Such apparatuses are generally designed to be installed once and not removed until being taken out of service or are designed and installed for one specific purpose and physical configuration. Conventional methods and apparatus are not conducive to temporary application, require a variety of tools and significant expenditures of labor for permanent installation, and are typically limited to specific dedicated applications due to the fixed geometric arrangement of conventional apparatuses. Further, and specific to aerodynamic device mounting methods and apparatuses, current art utilizes purpose-specific bolt-on attachments that are time consuming to install, provide attachment only for the product configuration for which they were specifically designed, and are not designed with the ability to readily remove the mount as a design requirement.

BRIEF SUMMARY OF THE INVENTION

According to one aspect, the subject application involves a mounting assembly for coupling an air drag reduction system to a trailer to be transported by an over-the-road tractor. The mounting assembly according to the present aspect includes a frame to be suspended adjacent to an underside of the trailer, and a receiver supported adjacent to a first end of the frame. The receiver is adapted to cooperate with a portion of a structural member of the trailer when installed. An adjustable fastening mechanism is separated a suitable distance from the receiver along the frame to be positioned adjacent to a second portion of the structural member opposite the portion that cooperates with the receiver. The adjustable fastening mechanism includes a cam that is adjustable to make contact with the second portion of the structural member of the trailer, thereby interfering with separation of the receiver from the portion of the structural member of the trailer with which the receiver cooperates.

According to another aspect, the subject application involves a mounting assembly for coupling an air drag reduction system to a trailer to be transported by an over-the-road tractor. The mounting assembly, according to the present aspect, includes a frame to be suspended adjacent to an underside of the trailer, and a receiver supported adjacent to a first end of the frame. The receiver includes a channel with an aperture that is to receive a portion of a flange of a structural beam of the trailer when installed. A fastening mechanism is pivotally coupled to the frame and is separated by an adjustable distance along the frame from the receiver. The fastening mechanism includes a camming wheel that is pivotal about an axis of rotation and is positioned to contact another portion of the structural beam and urge the receiver towards the flange. A position of the axis of rotation is adjustable relative to the frame by pivotal adjustment of the fastening mechanism between a first position where the wheel initially makes contact with the another portion of the structural beam and a second position where the wheel is partially compressed against the another portion of the structural beam. A locking device is also provided to interfere with pivotal adjustment of the fastening mechanism from the second position.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein:

FIG. 6 is a side view of an illustrative embodiment of a trailer to which an air drag reduction system has been coupled;

FIG. 7 is a bottom view of the trailer shown in FIG. 6; and

DETAILED DESCRIPTION OF THE INVENTION

Figure 1:
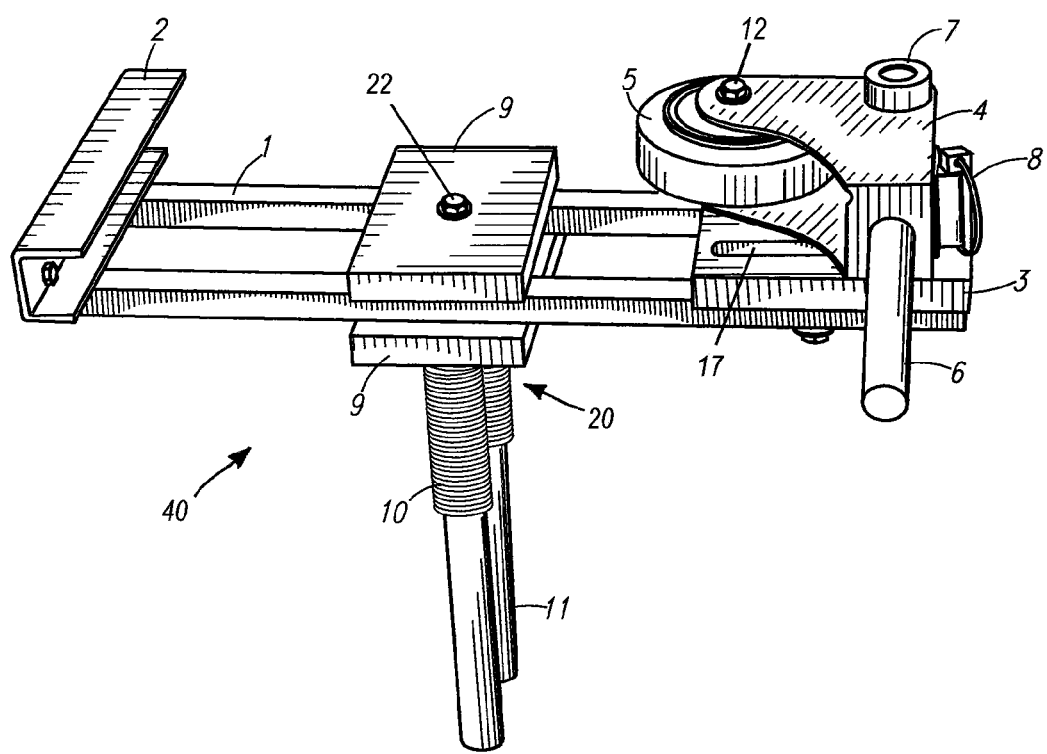
FIG. 1 is a perspective view of an illustrative embodiment of a mounting assembly for coupling an aerodynamic-enhancing component to an underside of a trailer to be pulled by an over-the-road vehicle.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Figure 5:
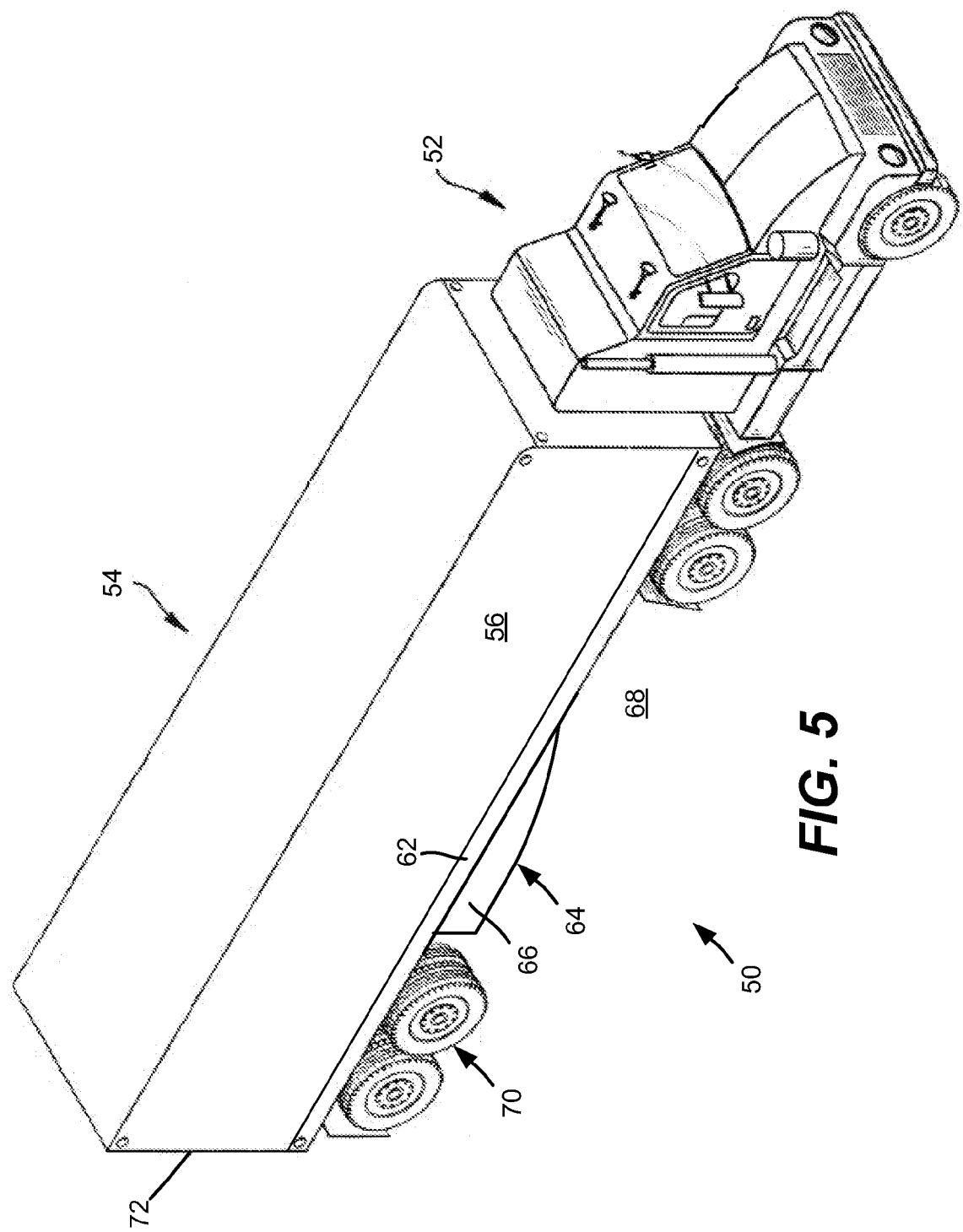
FIG. 5 shows a perspective view of an illustrative embodiment of a commercial truck comprising a tractor and a trailer to which an air drag reduction system has been coupled.

FIG. 5 shows an illustrative embodiment of a truck 50 comprising a tractor 52 operatively connected to a trailer 54 that is to be towed by the tractor 52. The embodiment of the trailer 54 appearing in FIG. 5 has a box-like enclosure 56 that is approximately 53 ft. in length in which cargo is placed to be transported from one location to another. Support for the trailer's floor is provided by structural beams 58 (FIGS. 5 and 7) that extend laterally, and substantially perpendicular to a longitudinal axis 60 of the trailer 54, between metallic frame members 62 that extend lengthwise along the lateral sides the trailer 54 and are coupled to opposite ends of the structural beams 58, such as I-beams, H-beams or the like. Although the embodiment of the trailer 54 in FIG. 5 is described as a 53 ft. enclosed trailer for the sake of brevity, it is understood that the trailer 54 can be any cargo hauling platform, such a trailer attached to a common chassis with the tractor (commonly referred to as a box truck), a trailer with an intermodal chassis, or any other cargo-hauling trailer used in the commercial transportation of goods.

An air drag reduction system 64 is shown coupled to an underside of the trailer 54 in FIG. 5. The air drag reduction system 64 includes a skirt 66, interchangeably referred to as an airfoil, that extends longitudinally along at least a portion of the trailer 54. The skirt 66 deflects a portion of the airflow entering the space between the underside of the trailer 54 and the road surface 68 while the truck 50 is underway. At least a portion of the deflected airflow that would otherwise impinge on the rearward wheel assembly 70 supporting the aft portion 72 of the trailer 54 above the road surface 68. Deflected by the skirt 66, the deflected portion of the airflow is directed laterally-outward, beyond externally-exposed sides of the rearward wheel assembly 70. The deflected airflow can optionally be directed to flow relative to the trailer 54 in a direction that is substantially parallel with the longitudinal axis 60 of the trailer 54, rather than in a direction protruding perpendicularly outward from under the trailer 54.

Figure 2:
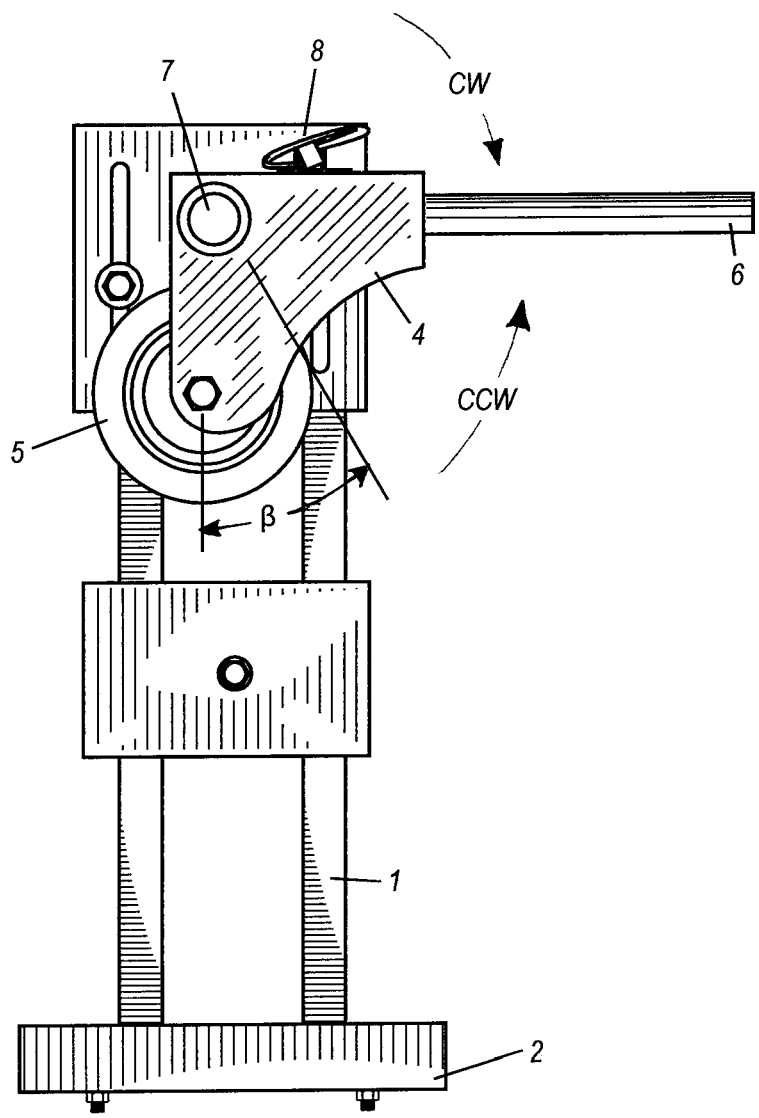
FIG. 2 is a side view of the mounting assembly in FIG. 1.

The skirt 66 can be sized and installed on the trailer 54 at a location between a forward-most tire 74 and a kingpin 76 for coupling the embodiment of the trailer 54 shown in FIGS. 1 and 2 to the tractor. The distance separating the forward-most tire 74 from the skirt 66 allows a portion of the airflow deflected laterally outward from under the trailer 54 to begin moving in a laterally inward direction again, generally towards the space under the trailer 54. As the portion of the deflected airflow begins to move in the laterally inward direction, it can once again contribute to the aerodynamic drag exerted on the trailer 54. Allowing the deflected portion of the airflow to begin moving in the laterally-inward direction again improves the slipstreaming ability of the truck 50 as a whole.

The skirts 66 can be mounted adjacent to each lateral side of the trailer 54 can be separated to form an aperture 78 between the leading portion 80 of each skirt 66, and positioned rearward along the axis 60 from a leading surface 82 of the trailer 54. For example, the leading portions 80 can be set back a distance of about 16 ft. to about 20 ft. from the leading surface 82 of the trailer 54. Other embodiments call for the leading portions 80 to be set back a distance of about 16 ft., 2 in. from the leading surface 82 of the trailer 54.

As shown in FIG. 7, the underside of the trailer 54 includes the exposed laterally-oriented structural beams 58. According to one illustrative embodiment, a frame assembly 84 of the air drag reduction system 64 couples the skirt 66 to the structural beams 58. For the embodiment shown in FIG. 7, the frame assembly 84 includes cross members 86 that extend between, and support top rails to which the skirt 66 is to be coupled. Two sets of cross members 86 are shown in the embodiment appearing in FIG. 7.

Figure 4:
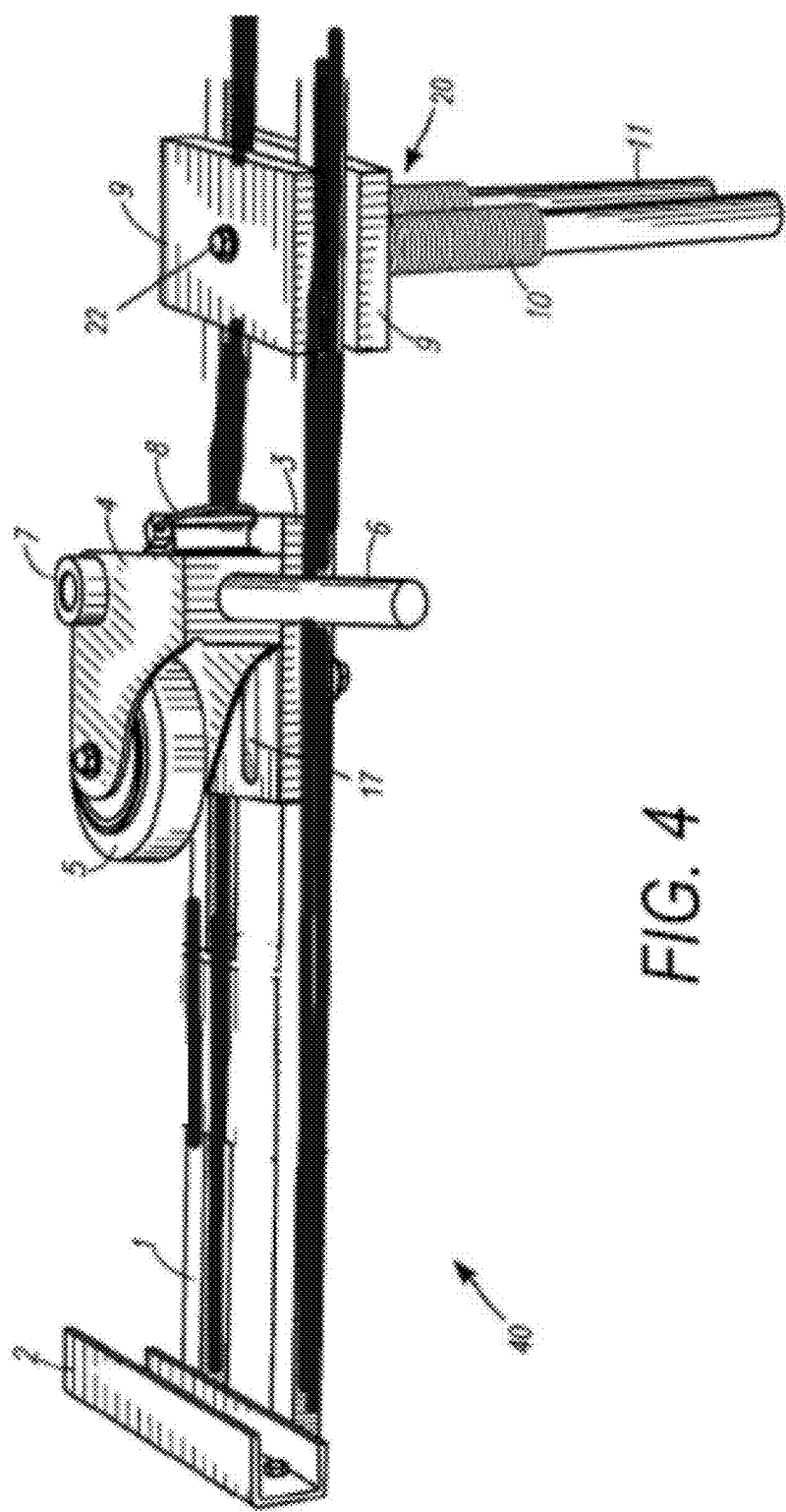
FIG. 4 is a perspective view of another illustrative embodiment of a mounting assembly including a receiver assembly coupled to frame rails at a location other than in between a channel and a fastening mechanism.

One or more of the cross members 86 can be provided with, or optionally coupled to a mounting assembly 40, illustrative embodiments of which are shown in FIGS. 1, 2 and 4, to couple the air drag reduction system 64 to the trailer 54. For the illustrative embodiment shown in FIG. 1, the mounting assembly 40 includes one or, as shown in FIG. 1, a plurality of frame rails 1 supporting at one end a receiver, illustrated in the present embodiment as a generally "U" shaped channel 2 oriented such that the open face of the "U" opens inwardly, in a direction along a longitudinal axis of the frame rails 1 toward an opposing fastening mechanism 4. Supported by the frame rails 1 adjacent to an end opposite the open end of the channel 2 is a base 3 that couples the adjustable fastening mechanism 4 to the frame rails 1. Embodiments of the frame rails 1 can optionally include scallops, or have holes through them such that a plate, slide, or box positioned in contact with the frame rails 1, above, below, or around, can have a pin or bolt positioned there through such that the plate, slide, or box cannot move in relation to the frame rail 1 unless the pin is removed.

Although described herein as a U-shaped channel for the sake of brevity, other embodiments of the receiver can include any desired shape that can cooperate with the structures of the trailer 54 described herein without departing from the scope of the present invention. For example, a plurality of protrusions extending inward that along the channel 2 can be oriented such that the protrusions on the surface of the channel 2 make contact with a structural member of the trailer 54 to which a mounting assembly 40 is to be installed, and the balance of the channel does not contact the structural member.

The fastening mechanism 4 includes a cam, such as a substantially-circular wheel 5 shown in the illustrative embodiment as including an outer peripheral surface opposing the open end of the channel 2. The peripheral surface of the wheel 5 can optionally be substantially elastically deformable. According to such embodiments, the wheel 5 can be made from an elastomeric material, or any other suitable material that can be substantially resiliently compressed as described below to urge the channel 2 onto a portion of the trailer 54. As shown in FIG. 1, the wheel 5 is pivotally coupled to the fastening mechanism 4 with an axis of rotation, corresponding to an axle 12, that is substantially parallel to an axis of rotation of the fastening mechanism 4 about a pivot pin 7 pivotally coupling the fastening mechanism 4 to the base 3. The orientation of the wheel 5 to rotate about an axis substantially parallel to the pivot pin 7 allows the wheel 5 to roll over a surface, such as the web 88 (FIG. 8) of one of the support beams 58 for example, as the fastening mechanism 4 is pivoted relative to the base 3 as described in detail below.

The connection between the base 3 and the fastening mechanism 4 can optionally be adjustable in directions parallel with the frame rails 1. Thus, the distance between the channel 2 and the wheel 5 can be adjusted to allow for installation of the mounting assembly 40 onto different structures having different dimensions, such as I-beams with different flange widths. For example, one or a plurality of elongated apertures 17 can be formed in the base 3 to extend longitudinally in a direction that is substantially parallel to the frame rails 1. A threaded fastener or other suitable fastener can be selectively loosened and tightened extends through the apertures 17 to cooperate with the fastening mechanism 4, thereby slidably coupling the fastening mechanism 4 to the base 3. According to such an embodiment, the fasteners coupling the fastening mechanism 4 to the base 4 can be loosened to allow the fastening mechanism 4 to be adjusted along the apertures 17, thereby facilitating adjustment of a distance separating the channel 2 and the wheel 5. With the desired spacing established, the fasteners can be tightened to interfere with further adjustment of the fastening mechanism 4 relative to the channel 2.

According to alternate embodiments, releasable fasteners can optionally be used to couple the base 3 to the frame rails 1 in a manner to allow adjustment of the distance separating the channel 2 from the wheel 5 by adjusting a position of the base 3 relative to the frame rails 1. Adjusting the position of the base 3 along a length of the frame rails 1 can be in addition to, or in lieu of adjustment of this distance by adjusting a position of the fastening mechanism 4 relative to the base 3 as previously described. Accordingly, the mounting assembly 40 can be adjusted to be equipped to different trailers possibly having different dimensions. Illustratively, the distance separating the bottom of the channel 2 (i.e., the left, vertical surface in FIG. 1 forming the bottom of the "U" shape that has been rotated clockwise 90° in that drawing) and the closest portion of the outer peripheral surface of the wheel 5 can be any suitable distance to allow the channel 2 to receive a flange 89 (FIG. 8) portion of the support beam 58 yet allow the wheel 5 to be elevated over the opposite end of the flange 89 portion to contact the web 88 of the support beam 58. For example, such distances can be adjusted throughout a range from about 8 inches to about 12 inches.

A leverage arm 6 or other suitable handle and/or lever extends from the fastening mechanism 4 to be manipulated by a user for pivoting the fastening mechanism 4, and accordingly the wheel 5, about the pivot pin 7. The leverage arm 6 can extend substantially radially outward from a center point of an axis of rotation of the pivot pin 7. A locking pin 8 can be provided to interfere with rotation of the fastening mechanism 4 about the pivot pin 7 once the fastening mechanism 4 and wheel 5 have been adjusted to their desired positions.

Figure 8:
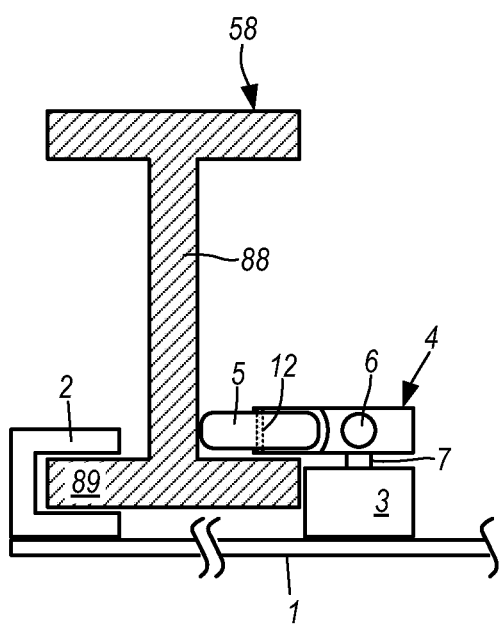
FIG. 8 is a cross-sectional view of a support beam, taken along line 8-8 in FIG. 7, on which a mounting assembly is installed.

Use of the mounting assembly 40 will be described during installation onto an I-beam that forms one of the support beams 58 of the trailer 54. In use, the channel 2 receives at least a portion of the flange 89 of the I-beam. The appropriate fastener(s) are adjusted and the distance separating the fastening mechanism 4 from the channel 2 is adjusted. This distance is sufficient to allow the wheel 5 to clear the end of the flange 89 portion opposite the end received by the channel 2 when the end of the mounting assembly 40 with the wheel 5 is elevated into place relative to the I-beam. The end of the mounting assembly 40 with the wheel 5 is elevated such that the wheel 5 is at an elevation vertically above the flange 89 portion, as shown in FIG. 8. Accordingly, the outer periphery of the wheel 5 is brought into close proximity to the substantially-vertical web 88 portion of the I-beam, but on an opposite side of the web 88 relative to the channel 2. According to alternate embodiments, this distance between the channel 2 and the wheel 5 can be established such that the out periphery of the wheel 5 contacts the web 88 portion of the I-beam (with the channel 2 in place) when the axis of rotation of the wheel is positioned approximately 20° off the longitudinal axis of the frame rail, an angle identified as $\beta$ in FIG. 2.

Initially positioning the mounting assembly 40 on the I-beam can be performed with the leverage arm 6, and accordingly the fastening mechanism 4, rotated in the counterclockwise direction, indicated by arrow CCW in FIG. 2, about 90° (i.e., $\beta=90°$). Doing so provides additional separation between the wheel 5 and the channel 2, allowing enough clearance for the wheel 5 to clear the flange 89 portion of the I-beam. To engage the I-beam with the mounting assembly 40 once in position, the leverage arm 6 is pivoted about pivot pin 7 in the clockwise direction, indicated by arrow CW in FIG. 2, until the wheel 5 makes contact with the web 88 portion of the I-beam. As explained above, according to an illustrative embodiment, the wheel 5 may initially make contact with the web 88 portion of the I-beam when the axis of rotation of the wheel 5 is positioned approximately 20° off the longitudinal axis of the frame rail (i.e., $\beta=20°$). The leverage arm 6 is then further rotated in the clockwise direction CW in FIG. 2, causing compression of the elastomeric wheel against the web 88 portion of the I-beam, and thereby applying a force urging the channel 2 onto the flange 89 portion toward the web 88 of the I-beam. The wheel 5 can be aligned to (i.e., $\beta=0°$), or a few degrees past (i.e., $\beta=$from about $-1°$ to about $-15°$), the longitudinal centerline of the frame rail 1 and the fastening mechanism 4 locked into place with the locking pin 8 to maintain the applied force. The leverage arm 6 can optionally be of a suitable length such that hand adjustment with the leverage arm 6 (i.e., grasped by a human hand and manually pivoted about the pivot pin 7 without the use of tools conveying an additional mechanical advantage) generates sufficient torque to fully pivot the wheel 5 about the pivot pin 7 to a position where the locking pin 8 is to be installed. Accordingly, the mounting assembly 40 can be installed without tools, and without compromising the integrity or otherwise requiring any alterations (i.e., no holes drilled, no welds, etc . . . ) of the support beam 58 to which the mounting assembly 40 is coupled. With the mounting assembly 40 in place, the airfoil or other aerodynamic-enhancement structure can be coupled to a mounting substrate such as one or more mounting posts 11.

As mentioned above, one or a plurality of the cross members 86 that are to extend between the skirts 66 on opposite sides of the trailer 54 can be coupled to the mounting assembly, thereby allowing for installation and removal of the air drag reduction system 64 as a single unit. According to alternate embodiments, a plurality of the mounting assemblies 40 can be provided to the same cross member 86 or the same set of cross members 86 (e.g., a mounting assembly 40 adjacent to each lateral end of the same cross member 86 or set of cross members 86) to securely couple the cross members 86, and accordingly, the air drag reduction system 64 to the trailer 54. Accordingly, two or more mounting assemblies 40 can be coupled to a common I-beam or other structural member of the trailer 54, allowing the mounting force to be applied at locations spanning a greater distance between mounting points.

Yet other embodiments of a system include the use of two or more individual mounting assemblies 40, optionally coupled to separate I-beams or other support beams 58 or structural member of the trailer 54 to provide the required rigidity. According to such embodiments, individual mounting assemblies 40 can optionally be coupled at desired locations adjacent to the sides of the trailer 54 along the axis 60. Thus, instead of being coupled to the cross members 86, the individual mounting assemblies 40 are provided, as needed, on each side of the trailer 54 independent of the mounting assemblies 40 provided adjacent to the other side of the trailer 54. For such embodiments, the mounting assemblies 40 on each side can optionally be coupled to rails to which only the skirt 66 for that side of the trailer 54 can be coupled, or optionally coupled to individual fastening features such as a receiver assembly 20 described below.

According to alternate embodiments, the mounting assembly 40 can optionally support a receiver assembly 20 that establishes a discrete point of attachment, rather than a rail that extends along a substantial distance of the skirt 66, to which a skirt 66 can be coupled using a clamp, mechanical fastener such as a bolt or screw for example, and the like. The mounting assembly 40 for such embodiments includes the receiver assembly 20 (FIGS. 1 and 4) that cooperates with a portion of the skirt 66 or other aerodynamic-enhancement apparatus, such as that disclosed in U.S. patent application Ser. No. 12/435,681 to Dayton, which is incorporated in its entirety herein by reference, to couple the skirt 66 of such an apparatus to the underside of the trailer 54. The receiver assembly 20 includes a bracket, shown in FIG. 1 as a pair of mounting plates 9 coupled together on opposite sides of the frame rails 1 by a threaded fastener 22. The plates can optionally be coupled together to couple them against the frame rails 1. According to alternate embodiments, however, one or both of the plates 9 can optionally be bolted through the frame rail 1 such that the at least one of the plates 9 cannot move once tightened against the frame rail 1. Additionally, one or both of the plates 9, such as the bottom plate 9 shown in the drawings, has between it and the frame rails 1 an elastomeric layer of material that is approximately one half inch (0.500 in.) thick. The threaded fastener 22, or other suitably releasable fastener, can be loosened to allow the mounting plates 9 to be adjusted relative to the frame rails 1 to adapt the mounting assembly 40 to the specific trailer in use. The threaded fastener 22 can then be tightened to fix the position of the plates 9 relative to the frame rails 1 once properly positioned.

Figure 3:
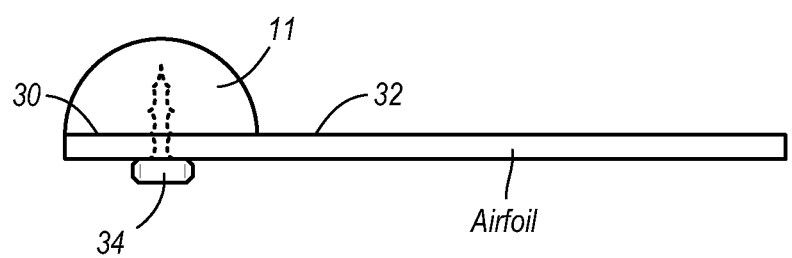
FIG. 3 is a top view looking down on an airfoil coupled to a mounting post with a threaded fastener.

A coil spring 10, or a substantially elastically-deformable material for example is coupled to, and extends generally downward, away from the frame rails 1, thereby flexibly coupling mounting posts 11 to the bottom plate 9. According to illustrative embodiments, the mounting posts 11 can have a substantially circular cross section. For such embodiments, the airfoil or other aerodynamic-enhancement feature to be coupled to the trailer can be provided with a loop, circular clamp, sleeve, or other feature compatible with the mounting posts 11, of which a typical cross section is a semi-circle. According to other embodiments, the mounting posts 11 can have a substantially-semicircular cross-sectional shape, as shown in FIG. 3. As shown in FIG. 3, a substantially-planar surface 32 of the airfoil to be coupled to the trailer can be placed against a substantially-planar face 30 of the mounting post 11. A threaded fastener 34 such as a screw, bolt, etc . . . , or any other releasable fastener desired can be inserted through the airfoil and at least partially through the mounting post 11 to couple the airfoil to the mounting post 11.

According to another embodiment shown in FIG. 4, frame rail(s) 1 can optionally extend beyond channel 2 and/or the fastening mechanism 4 and the receiver assembly 20 may be located such that it mounts on the extended section(s). According to the example in FIG. 4, an illustrative embodiment includes a receiver assembly 20 that is coupled to the frame rails 1 beyond the fastening mechanism 4, allowing a wide range of installation options.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mounting assembly for coupling an air drag reduction system to a trailer to be transported by an over-the-road tractor, the mounting assembly comprising:
   a frame to be suspended adjacent to an underside of the trailer;
   a receiver supported adjacent to a first end of the frame, wherein the receiver is adapted to cooperate with a structural portion of the trailer when installed; and
   an adjustable fastening mechanism separated a suitable distance from the receiver along the frame to be positioned adjacent to a second structural portion of the trailer, when installed, opposite the portion that cooperates with the receiver, the adjustable fastening mechanism comprising an adjustable cam and a leverage arm that is pivotally adjustable about an axis to urge the cam generally toward the second structural portion of the trailer and cause the cam to make secure contact with the second structural portion of the trailer, thereby interfering with separation of the receiver from the first structural portion of the trailer with which the receiver cooperates.

2. The mounting assembly of claim 1, wherein the secure contact between the cam and the second structural portion generates a force that urges the receiver toward the first structural portion with which the receiver cooperates.

3. The mounting assembly of claim 1, wherein the suitable distance separating the receiver from the cam is adjustable along a longitudinal axis of the frame.

4. The mounting assembly of claim 1, wherein the receiver comprises a channel in which a flange portion of a structural member forming the first structural portion is to extend.

5. The mounting assembly of claim 1 further comprising a base that is coupled to the frame and disposed between the frame and the fastening mechanism, wherein the leverage arm included as part of the fastening mechanism is pivotally coupled to the base to pivot about the axis of rotation relative to the base.

6. The mounting assembly of claim 5, wherein the base is adjustably coupled to the frame to be adjusted to a plurality of different positions along the frame, thereby adjusting the suitable distance separating the receiver from the cam along a longitudinal axis of the frame.

7. The mounting assembly of claim 5, wherein the fastening mechanism is adjustably coupled to the base to be adjusted to a plurality of different positions relative to the base, thereby adjusting the suitable distance separating the receiver from the cam along a longitudinal axis of the frame.

8. The mounting assembly of claim 1, wherein the cam included as part of the fastening mechanism is pivotally coupled to pivot about an axis of rotation relative to the frame.

9. The mounting assembly of claim 8, wherein the cam comprises a substantially-circular wheel formed from a substantially-elastically compressible material.

10. The mounting assembly of claim 9, wherein the suitable distance between the receiver and the wheel is sufficient to establish contact between the wheel and the second structural portion when the leverage arm of the fastening mechanism is pivoted about twenty)(20° degrees from a longitudinal axis of the frame.

11. The mounting assembly of claim 1 further comprising a locking device that interferes with pivotal adjustment of the leverage arm of the fastening mechanism relative to the frame.

12. The mounting assembly of claim 1 further comprising a fastening fixture adjustably coupled to the frame, wherein a position of the fastening fixture along the frame is adjustable.

13. The mounting assembly of claim 12, wherein the fastening fixture comprises a mounting substrate that extends downwardly from the frame.

14. The mounting assembly of claim 13 further comprising a fastener that releasably couples an airfoil to the mounting substrate.

15. The mounting assembly of claim 13, wherein the mounting substrate is coupled to the frame by a flexible connector that substantially-elastically deforms in response to being subjected to an impact.

16. A mounting assembly for coupling an air drag reduction system to a trailer to be transported by an over-the-road tractor, the mounting assembly comprising:
   a frame to be suspended adjacent to an underside of the trailer;
   a receiver supported adjacent to a first end of the frame, wherein the receiver comprises a channel with an aperture that is to receive a portion of a flange of a structural beam of the trailer when installed;
   a fastening mechanism that is pivotally coupled to the frame and is separated by an adjustable distance along the frame from the receiver, the fastening mechanism comprising a camming wheel that is pivotal about an axis of rotation and is positioned to contact another portion of the structural beam and urge the receiver towards the flange, wherein,
      a position of the axis of rotation is adjustable relative to the frame by pivotal adjustment of the fastening mechanism between a first position where the wheel initially makes contact with the another portion of the structural beam and a second position where the wheel is partially compressed against the another portion of the structural beam; and
   a locking device that interferes with pivotal adjustment of the fastening mechanism from the second position.

17. The mounting assembly of claim 16 further comprising a fastening fixture adjustably coupled to the frame, wherein a position of the fastening fixture along the frame is adjustable.

18. The mounting assembly of claim 16 further comprising a base that is coupled to the frame and disposed between the frame and the fastening mechanism, wherein the fastening mechanism is pivotally coupled to the base.

19. The mounting assembly of claim 18, wherein the base is adjustably coupled to the frame to be adjusted to a plurality of different positions along the frame, thereby adjusting the adjustable distance separating the receiver from the wheel along a longitudinal axis of the frame.

20. The mounting assembly of claim 18, wherein the fastening mechanism is adjustably coupled to the base to be adjusted to a plurality of different positions relative to the base, thereby adjusting the adjustable distance separating the receiver from the wheel along a longitudinal axis of the frame.

21. A mounting assembly for coupling an air drag reduction system to a trailer to be transported by an over-the-road tractor, the mounting assembly comprising:
   a frame to be suspended adjacent to an underside of the trailer;
   a receiver supported adjacent to a first end of the frame, wherein the receiver is adapted to cooperate with a portion of a structural member of the trailer when installed; and
   an adjustable fastening mechanism separated a suitable distance from the receiver along the frame to be positioned adjacent to a second portion of the structural member opposite the portion that cooperates with the receiver, wherein the suitable distance separating the receiver from the cam is adjustable along a longitudinal axis of the frame, the adjustable fastening mechanism comprising a cam that is adjustable to make contact with the second portion of the structural member of the trailer and thereby interfere with separation of the receiver from the portion of the structural member of the trailer with which the receiver cooperates.

* * * * *